United States Patent
Beaujard et al.

(10) Patent No.: US 6,405,931 B1
(45) Date of Patent: Jun. 18, 2002

(54) METHOD OF MANAGING UPGRADEABLE APPLICATIONS IN A TERMINAL/SMART CARD SYSTEM

(75) Inventors: Olivier Beaujard, Neuilly; Cédric Huet, La Ciotat, both of (FR)

(73) Assignee: Gemplus (FR)

( * ) Notice: Subject to any disclaimer, the term of this patent is extended or adjusted under 35 U.S.C. 154(b) by 87 days.

(21) Appl. No.: 09/596,551

(22) Filed: Jun. 19, 2000

Related U.S. Application Data

(63) Continuation of application No. PCT/FR98/02586, filed on Dec. 2, 1998.

(30) Foreign Application Priority Data

Dec. 19, 1997 (FR) .............................................. 97 16195

(51) Int. Cl.[7] .............................................. G06K 19/06
(52) U.S. Cl. ........................................ 235/492; 235/482
(58) Field of Search ................................. 235/492, 382

(56) References Cited

U.S. PATENT DOCUMENTS 5,719,387 A * 2/1998 Fujioka ...................... 235/492

FOREIGN PATENT DOCUMENTS

| EP | 0114773 | | 8/1984 |
| EP | 0490455 A2 | | 6/1992 |
| EP | 0662674 A1 | | 7/1995 |
| EP | 0717381 A1 | | 6/1996 |
| EP | 0757336 A1 | | 2/1997 |
| FR | 2696888 | | 4/1994 |
| GB | 2248707 | * | 4/1992 |
| WO | WO96/38826 | | 12/1996 |

* cited by examiner

Primary Examiner—Harold I. Pitts
(74) Attorney, Agent, or Firm—Burns, Doane, Swecker & Mathis, L.L.P.

(57) ABSTRACT

The invention concerns a method for adapting terminals for chip cards to enable them to present and execute operations for which they were not signed, which consists in equipping the chip cards with a link memory associated with a reading and translating program and in presenting data read in said memory to the terminal in a form which can be used by an interface program. Thus, by modifying the card link memory, applications executable by the terminal can be added ore removed.

6 Claims, 3 Drawing Sheets

FIG. 2c     FIG. 2d

| IDENTIFIER | PRESENTATION | NATURE OF OBJECT | ACTIONS OF TERMINAL LINKED TO OBJECT BY COMMANDS | | | |
|---|---|---|---|---|---|---|
| 01 | 00 | BANK XYZ | | | | |
| 01 | 01 | 1 - ACCOUNT | A | B | C | D |
| 01 | 01 | 2 - INFORMATION | A' | B' | C' | D' |
| 01 | 02 | 3 - TELEPHONE | A" | B" | C" | D" |
| 02 | 02 | ACCOUNT | | | | |
| 02 | 01 | 1 - BALANCE | | | Z | |
| 02 | 04 | 2 - TRANSFER | | | | |
| 02 | 01 | 3 - HISTORY | | | | |
| 03 | 00 | BALANCE | | | | |
| 03 | 01 | CREDIT BALANCE | | | | |
| --- | --- | --- | --- | --- | --- | --- |
| 02 | 04 | 4 - INSURANCE | A1 | B1 | C1 | D1 |

FIG. 3

METHOD OF MANAGING UPGRADEABLE APPLICATIONS IN A TERMINAL/SMART CARD SYSTEM

RELATED APPLICATIONS

This disclosure is based upon, and claims priority from, French Patent Application No. 97/16195, filed Dec. 19, 1997, and is a continuation International Application No. PCT/FR98/02586, filed Dec. 2, 1998.

FIELD OF THE INVENTION

The present invention pertains to a method of managing a transaction between a terminal and a smart card. It also relates to the intervention of an operator. In the context of the invention, both the terminal and the chip in the card are provided with signal processor.

BACKGROUND OF THE INVENTION

Terminals for smart cards are known, used notably in the banking field, in the field of identity checking, in payment operations and in mobile telephone applications of the GSM type. Nevertheless, they are applicable to all fields in which a terminal comes into relationship with a smart card and an operator.

The above statement of the known applications for the use of smart cards in transactions is synonymous with the fact that the terminals and cards are dedicated. In the majority of cases, the cards are of the type that are solely provided with memory. The card reader, e.g. the terminal, has an operating system for firstly connecting with a smart card and secondly initiating a program which uses the smart card. For example, in the banking field, for withdrawing money at a terminal, the program recorded in a program memory of the terminal is of such a nature as to cause to be displayed on a screen of this terminal all the images necessary for the operator to understand the steps to be gone through in order to perform the transaction.

These user programs can be very simple. In the case where the terminal is a payment terminal, it merely requests the operator to key in a secret code in order to enable payment. They can also be more complex. This is precisely the case when the terminals are mobile telephone appliances. In the latter case, the user program of the terminal includes a hierarchical succession of menus presenting options which the operator can choose in order to benefit from a particular service amongst many services.

The difficulty presented by the terminals of the state of the art is that updating them becomes a veritable problem. This is because it is becoming more and more frequent for the user program or the operating system of the terminals to be modified.

The procedure for the delivery of a service by a terminal to which a smart card is connected takes place as follows. The terminal launches its operating system and prepares to display certain (known) options which it is able to offer to the operator. The terminal then interrogates the card in order to know whether a card is able to deliver the options in question. Where applicable only the options authorized by the card are displayed on the terminal screen. A problem arises when it is desirable for the card carriers to benefit from new options whilst the operating system and the terminal application program are unaware of the very existence of these options and are therefore not capable of interrogating the chip card on its potentiality in this regard, and hence failing to offer it on the screen.

In addition to the display problem proper, there is an underlying problem of execution of the supplementary option chosen in the menu by the operator. This is because the choice of an option amounts either to making the terminal launch a sub-program or causing a switch to the particular point in the operating software of the terminal. The nonexistence of such a sub-program, when it is a case of a new option or a corresponding switching point, makes, beyond the display of the option, the execution of an additional option impossible.

As an improvement, it is preferable for the service relating to a supplementary option to be accompanied by an execution of certain actions, by the terminal processor and/or the smart card. In this case, with the invention it will be shown that this can be accomplished without having to previously change the operating system or the user program for the terminal and smart card.

SUMMARY OF THE INVENTION

The principle of the invention consists essentially in providing the terminal with an interface program and providing the card with a link memory with which a reading and translation program is associated. This interface program is provided for reading the link memory by means of the reading and translation program. The reading of this link memory is selective according to known criteria. This program then takes from the link memory of the card all the records corresponding to the selection. It is then capable, in combination with the programs normally resident in the terminal, to present the options and execute them.

The updating and the changes in the applications do not then need to be carried in the terminal and card since the information relating to the options available is solely present in the link memory of the card.

The object of the invention is therefore a method of managing a transaction between a terminal provided with a processor, a smart card provided with a processor and an operator who selects, with commands for the terminal, actions for the terminal to execute. This method includes the following steps:

there are stored, in a non-volatile memory of the card, a link memory and a reading and translation program for the link memory, each link in the link memory having, in a record in this link memory, a designation of an option to be chosen in a menu linked to a selection criterion for this option, the card reading and translation program executes a selective reading according to at least one of the criteria of the link memory, and an interface program of the terminal executes the designations resulting from the implementation of the link memory reading and translation program.

BRIEF DESCRIPTION OF THE DRAWINGS

The invention will be more clearly understood from a reading of the following description and an examination of the figures which accompany it. These are given only as an indication and are in no way limitative of the invention. In the figures:

FIGS. 2a, 2b, 2c, and 2d are representations of displays caused by the program of the invention on a screen of the terminal in FIG. 1; and FIG. 3 is a schematic representation of a link memory useful for implementing the method of the invention.

DETAILED DESCRIPTION

Figure 1:
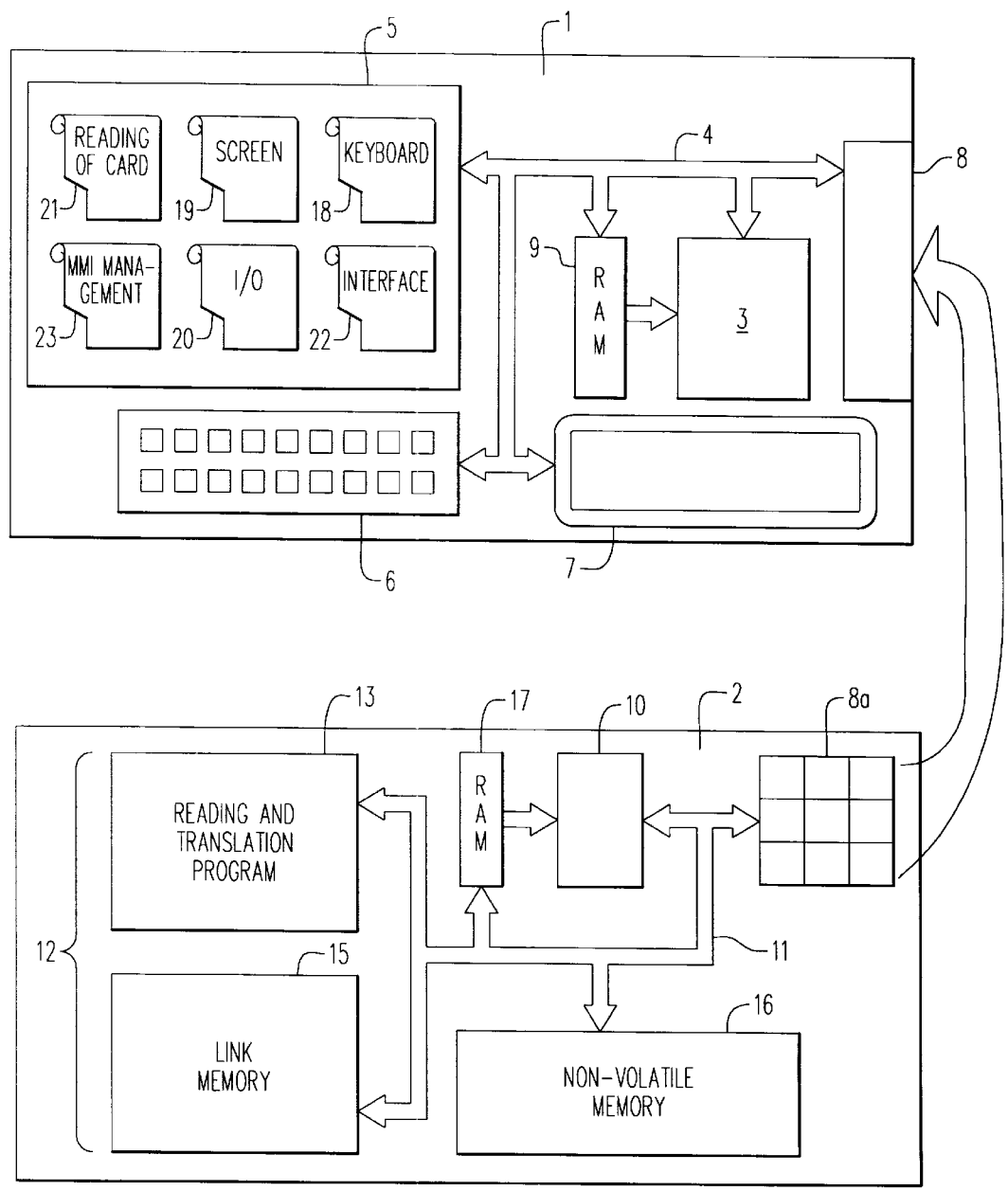
FIG. 1 is a representation of a terminal and smart card which can be used for implementing the method of the invention.

FIG. 1 shows a terminal 1 and a smart card 2 used for implementing the method of the invention. The terminal has a processor 3 which is connected, by means of a command, data and address bus 4, with a program memory 5, a control keyboard 6, a display screen 7, an input/output interface 8 and a working memory 9. The keyboard 6 is used by an operator, not shown, to enter commands in order to cause the performance of certain services by the terminal 1. The input/output interface 8 is intended to afford connection with the smart card 2. It has in particular a connector for connecting with a connector 8a of the smart card 2.

The smart card 2 also has a processor 10 in connection, through an address, command and data bus 11, with a set of memories 12, a data memory 16 and a working memory 17. The program memory 5 of the terminal and the set of program memories 12 of the card and the data memory 16 of the latter are non-volatile memories. The set of memories 12 of the card preferably has a link memory 15 and a memory 13 that stores a program for reading and translating the link memory.

Amongst the programs contained in the operating system of the terminal 1, and schematically depicted as memories in the memory 5, are selectable programs making it possible to perform the required operations. These programs can, for example, include a program 18 for managing the keyboard 6, a program 19 for managing the screen 7, a program 20 for managing the input/output interface 8 and a program 23 serving as a man-machine interface between the operator and terminal.

So as to be able to read cards which are cards with a memory only (without processor 10), the memory 5 can also have a program 21 for reading the memories of these cards.

It finally has a program 22 which is capable of providing the relationship with the smart card 2.

The program 13 reads and translates, in one accepted representation for the interface 8a, the objects of the link memory 15 and conveys them into the working memory 17 where they are made available to the terminal via the interface 8a. The main aim is that the information to be displayed on the screen 7 arrives on the bus 4. It is placed there by the processor 3 by means of the programs 22 and 23. The actions of the user, transmitted by the keyboard 6, by means of the management program 18, are translated by the program 22; the aim being to transmit these actions to the program 13 via the interfaces 8 and 8a. Finally, as a function of the link memory 15 and the transmitted actions, the program 13 can determine the remainder of the session.

FIGS. 2a to 2d show figuratively respectively the terminal 1 provided with its screen 7 and its keyboard 6.

Figure 2A:
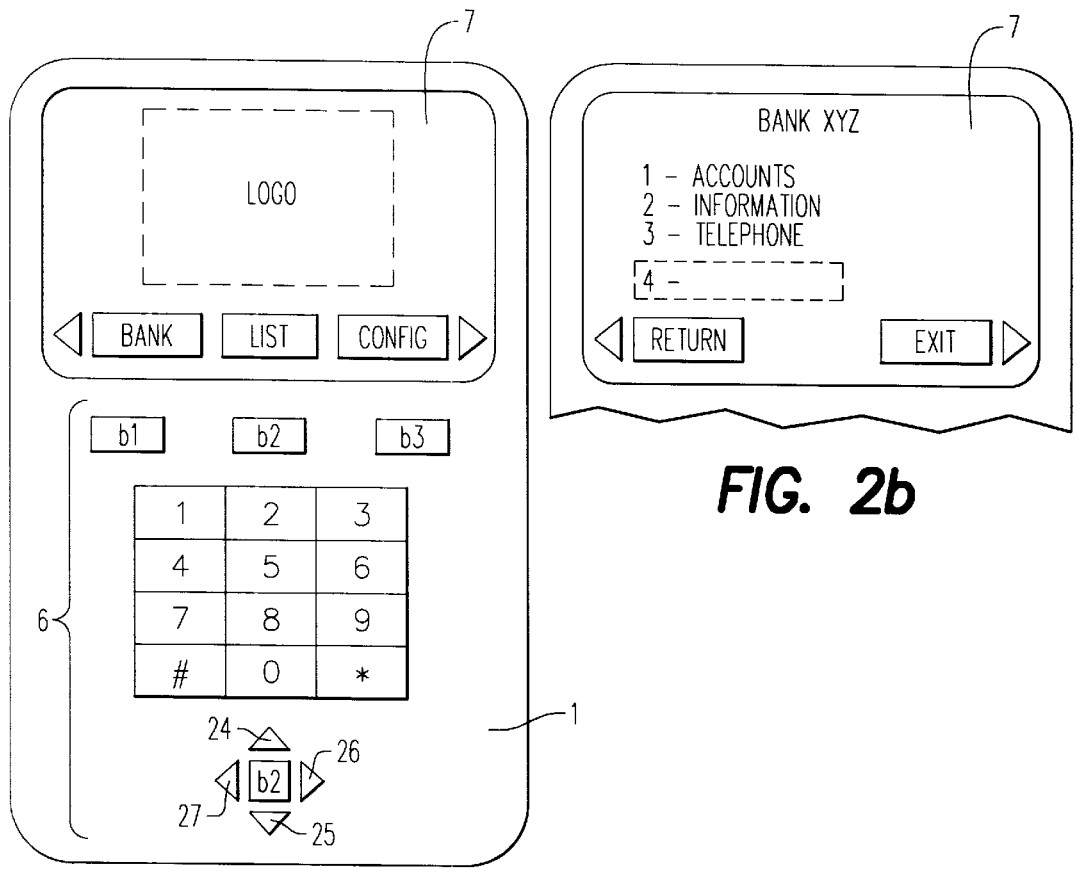
Figure 2B:
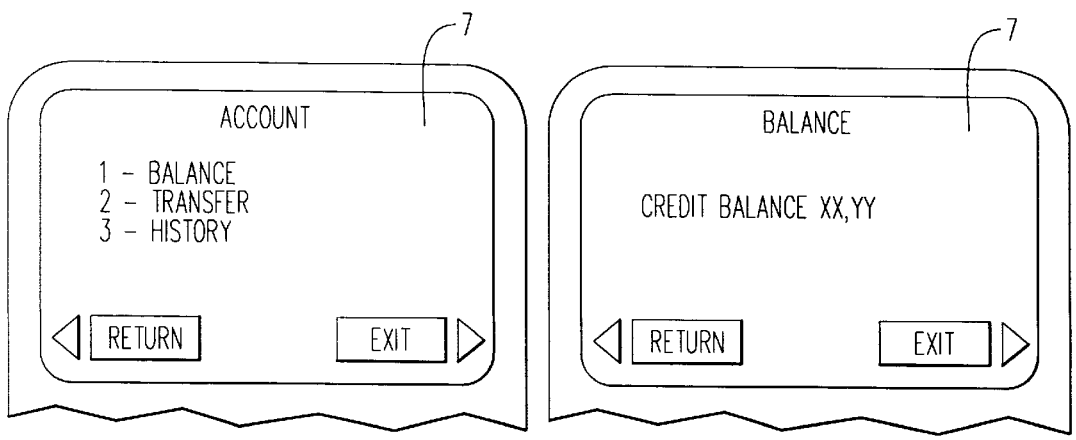

In FIG. 2a the entire terminal 1 is depicted; in FIGS. 2b to 2d, only the screen has been depicted in order to show the navigation of an operator amongst the different options in the menus offered. The terminal depicted is a telephone terminal, and the keyboard includes keys 1 to 9 and 0, as well as the number key and the star key. It also has a set of buttons b1 to b4, as well as a set of arrows 24 to 27 making it possible, like a track ball or a microcomputer mouse, to move highlighting on the screen. Thus, the highlighting is placed on an option BANK in FIG. 2 whilst two other options LIST and CONFIG (standing for configuration) are also depicted.

The functions of the buttons b1 to b4 can be standardized or free. The selection of an option can be effected by manipulating the arrows 24 to 27, in order to highlight it, and by pressing the button b2 to be effected. In another mode of action, the buttons b3, b4 and b1 are situated opposite the display on the screen 7 of certain options, and the choice of one of these buttons comprises the selection of the chosen option which is opposite the button.

Such a selection mode entails, in FIG. 2b, the display on the screen 7 of the different sub-options corresponding to a chosen option. Thus, for the application BANK, the display will include in one example, in a first line, the designation BANK XYZ of the name of the bank designated in the smart card 2. On lines 2, 3, 4 and 5 preceded by a ranking number 1 2, 3 and 4 there appear the designations of available sub-options. A sub-option Accounts has been shown. The operator may wish, with it, to carry out an operation in relation to his bank account. A suboption Information makes it possible to display information on the bank: its address, the business hours, etc. A sub-option Telephone makes it possible, by selecting it, to obtain a telephone communication directly with the bank.

FIGS. 2c and 2d show what happens if the suboption Account is chosen in the menu BANK, and if the sub-sub option Balance is chosen in the sub-option Account.

In the state of the art, the program 22 was capable of implementing these three options. For the reasons of development of the service of the bank, the bank may desire to make an insurance service available to its customers. This service, appearing on the fifth line with the ranking 4 on the screen 7, was not provided in the program 22. Normally this program 22 cannot display it on the screen 7. Beyond display per se, the corresponding service cannot not be initiated in the state of the art, either.

FIG. 3 shows link memory 15. This memory is preferably of the programmable and erasable type so as to be able to update it. The memory 15, organized in the form of a table, is identified as a link memory since it includes in its records links between information of different types. Each record in the table of links has, for each type of information, a certain number of bytes. For a first type 28, three of these bytes, for example the first three, represent an object identifier. Object identifiers indicate all the information having to appear at a given moment on a screen 7 when an option or sub-option has been chosen.

For another type of information 29, co-called presentation information, the table 15 also preferably, but not necessarily, contains two bytes (or a single byte, or even three or four bits), for presenting the object on the screen. In a certain number of following bytes, in column 30, for example twelve bytes, the table 15 contains a type of information representing the nature of the object. Thus the designation corresponding to the object can be entered in the twelve bytes as it is to be displayed.

Finally, in columns referenced 31 to 34, there have been indicated references of actions, related to the objects and capable of being triggered by particular buttons, or a particular configuration of buttons on the keyboard 6. In the context of the use of telephones of the GSM type, the standard has defined and imposed the use of four buttons. It is for this reason that four columns have been shown here. Nevertheless, it would be possible to have a different number of buttons and to place a different number of corresponding columns in each record. In each record, at each column 31 to 34, a space has been reserved, in one example, corresponding to one byte. The column 31 corresponds to the action which is likely to be initiated by pressing on the button b1. The column 32 corresponds to an action which is likely to be initiated with the button b2, the column 33 with the button b3 and the column 34 with the button b4.

The links mentioned for the link memory consequently associate at least the nature of an object, column 30, with the identifier of the object, column 28. if it is not a case of displaying information only but also initiating operations, the link concerns the association of the nature of the object, column 30, with the identifier of the object, column 28, and with the list, columns 31 to 34, of the actions corresponding to the different buttons which can be actuated.

Preferably, of course, the place of the option or sub-option on the screen is also associated with the record.

In accordance with what was seen in FIG. 2a, the link memory 15 has an object identifier 01 for everything regarding the bank with presentations of objects on the screen defined by the codes in the column 29.

It has also been considered that the image appearing on the screen in FIG. 2c is a second object. The wordings displayed for this record object correspond to information corresponding to the number 02 in records in the memory 15. The sub-sub-option BALANCE, which is the third object, has two records of the object, one record for the wording BALANCE and another record for CREDIT BALANCE. The purpose is in one example to indicate a balance. And so on, the different options can be recorded in the memory 15.

When the bank decides to make the supplementary option Insurance available to its customers, it updates the cards of its customers: it inserts therein a line with an object identifier 02 in column 28, corresponding to the object Bank, an object presentation number 04 in column 29, an indication 4-Insurance in column 30, and references to actions D1, C1, B1, A1 in columns 31 to 34.

FIGS. 2b to 2d also show indications at the bottom of the screen RETURN or EXIT, which are help information which may be imposed by a standard, or by custom in one field. The display of this information can be managed by a conventional screen management program 19. The help wordings, RETURN or EXIT, can preferably be placed above buttons b1 and b3 which correspond to them in the standard.

In columns 31 to 34, it was shown that the actions could be varied and differentiated as required, from one record to another. For example, for the option 1-Balance in the menu ACCOUNT, FIG. 2c, pressing on the button 62 when the pointer 42 points to this option, causes an action referenced Z. The action Z will have the effect first of causing the third object to be displayed with its two lines entitled BALANCE, below which there appears CREDIT BALANCE. The instruction referenced by Z will nevertheless be more complete. It includes, at the initiative of the processor 3 which implements the reading and translation program 13, the execution of a telephone link with the bank concerned, an interrogation of the balance in the account (with necessary passwords and secret security codes), a transfer of the balance read in the telephone link, and the display of the corresponding amount XX,YY to the right of the title CREDIT BALANCE. Possibly a third object could be set up, recordable in the memory 15, and corresponding precisely to the amount XX,YY. In this case, the display caused by the specific interface will include an option of displaying the former balance or a refresh option, that is to say launching the operations seen above.

What is claimed is:

1. A method for managing a transaction between a terminal provided with a processor, a smart card provided with a processor, and an operator who selects, with commands for the terminal, actions for the terminal to execute, comprising the following steps:

storing, in a non-volatile memory of the card, a link memory and a reading and translation program for the link memory, each link in the link memory having, in a record in this link memory, a designation of an option to be chosen in a menu linked to a selection criterion for said option;

executing a selective reading with the reading and translation program according to at least one of the criteria of the link memory, and executing designations resulting from the implementation of the reading and translation program of the link memory by means of an interface program of the terminal.

2. A method according to claim 1, wherein each link in the link memory also associates, in a record in the link memory, a designation of an option to be chosen in a menu and a set of references to actions to be executed, and the processor in the smart card executes an interpretation of a reference to an action to be executed, and wherein the processor in the terminal executes instructions resulting from this interpretation.

3. A method according to claim 1, wherein an object identifier is allocated to each record in the link memory in order to have the selective reading and translation program (13) in the link memory executed, and records in the link memory which include the same object identifier are selected for presentation.

4. A method according to claim 1, wherein presentation information for the terminal is allocated to each record in the link memory, and the result of the translation with this presentation information is presented to the terminal.

5. A portable electronic device of the smart card type, comprising a processor, a RAM memory and a non-volatile memory, and further including a link memory and an associated reading and translation program.

6. A terminal comprising a processor, a programmable memory, an input-output interface for communicating with a portable electronic device of the smart card type, man/machine interface means and means for managing a relationship between the terminal and a smart card, of a type having a link memory and an associated reading and translation program, wherein said means for managing a relationship between the terminal and the smart card executes designations resulting from the use of the reading and translation program of the smart card.

* * * * *